Nov. 1, 1955 W. A. FINK ET AL 2,722,254
BAND SAW GAUGE PLATE ADJUSTING MECHANISM
Original Filed Aug. 23, 1947 3 Sheets-Sheet 1
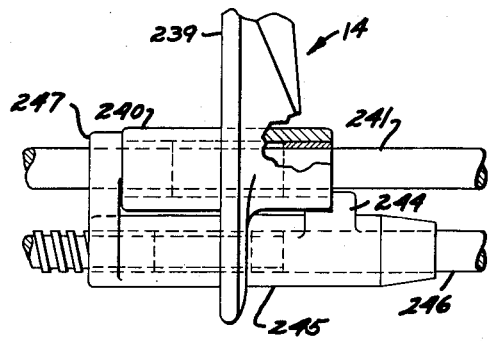
Fig. V
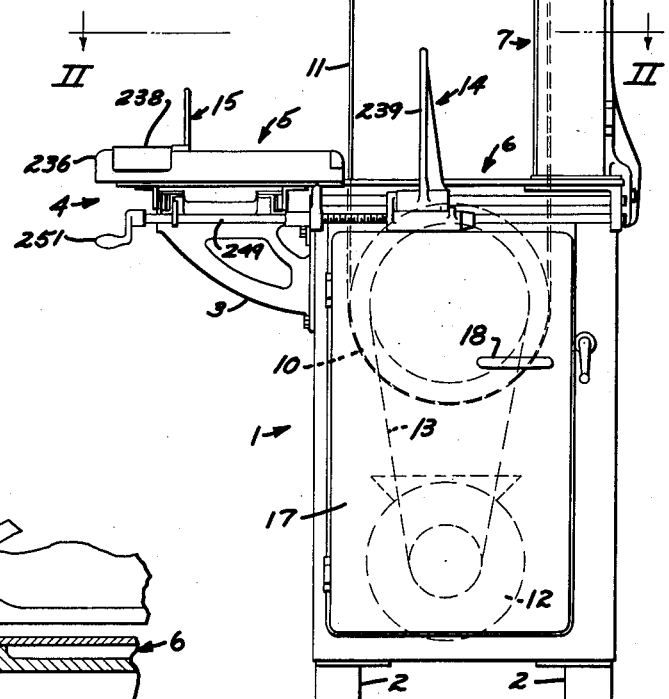
Fig. I
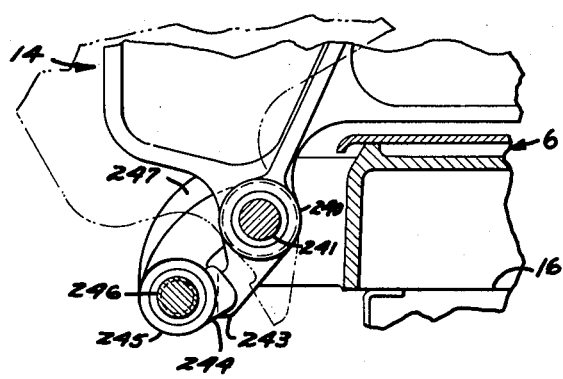
Fig. IV
INVENTORS
WALTER A. FINK
JAMES D. BROWN
BY
Marshall, Marshall & Hastings
ATTORNEYS

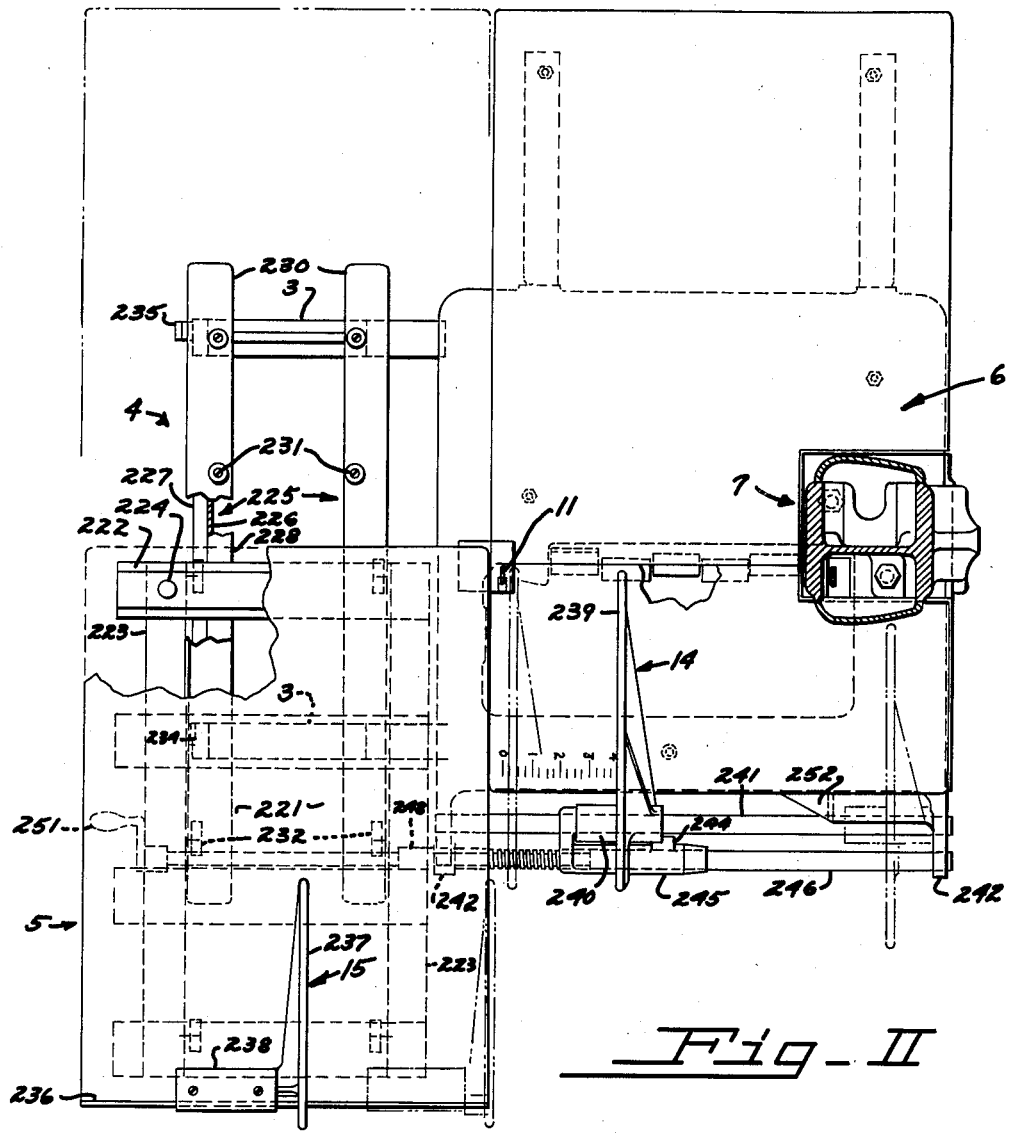
Fig. II
INVENTORS
WALTER A. FINK
BY JAMES D. BROWN

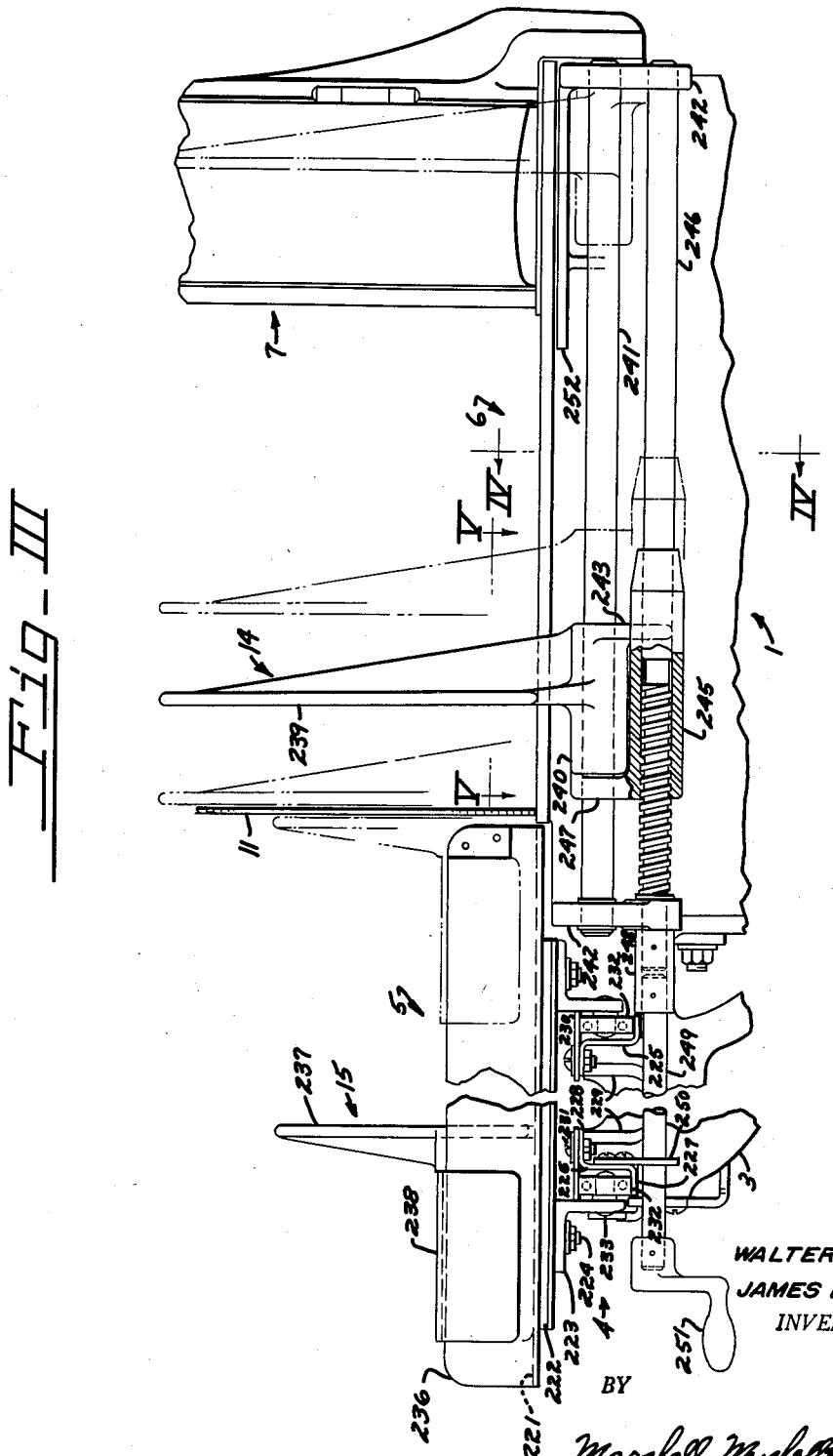

United States Patent Office 2,722,254
Patented Nov. 1, 1955

2,722,254

BAND SAW GAUGE PLATE ADJUSTING MECHANISM

Walter A. Fink and James D. Brown, Toledo, Ohio, assignors to Toledo Scale Company, Toledo, Ohio, a corporation of Ohio Original application August 23, 1947, Serial No. 770,247, now Patent No. 2,617,451, dated November 11, 1952. Divided and this application April 21, 1952, Serial No. 283,448

5 Claims. (Cl. 146—88)

This invention relates to gauge plate adjusting means for meat cutting band saws, and is a division of our copending application Serial No. 770,247, now U. S. Patent No. 2,617,451.

The principal object of this invention is to provide a meat cutting band saw with a thickness gauge plate which can be moved from its position whereby slices of meat of a certain thickness can be cut to a position removed from the general area of the saw blade to permit cutting of meat of large portions, and can then be brought back to its original setting without further adjustment.

It is another object of this invention to provide simple and easily accessible means for adjusting a gauge plate of a meat cutting band saw.

It is still another object of this invention to provide gauge plate adjusting means which can be easily operated by a butcher with greasy or tallowy hands.

Other objects and advantages will be apparent from the following description in which reference is had to the accompanying drawings illustrating a preferred form of the invention.

According to the invention, a gauge plate is adjusted a certain distance from a saw blade for cutting slices of meat to a certain thickness by turning a motion-transmitting screw carrying a positionable nut which in turn slides the gauge plate along a guide rod parallel to the screw. Whenever large portions of meat are to be cut, the gauge plate may be removed from its setting by pivoting the gauge plate slightly on the rod to disengage it from the nut and then sliding it to the rear of the machine on the rod until it is out of position whereby it would obstruct cutting of the large portions of meat. When it is again desired to cut slices of meat to the same thickness as they were cut originally, the gauge plate is slid back along the rod toward the nut, and is again pivoted to become locked on the nut in its original position.

In the drawings:

Figure I is a right end elevation of a meat cutting band saw embodying the gauge plate adjusting mechanism.

Figure II is a plan view on an enlarged scale taken along line II—II of Figure I, parts being broken away and parts shown in section.

Figure III is a greatly enlarged fragmentary view partly in section illustrating a construction for adjusting the thickness gauge plate, parts being broken away.

Figure IV is a fragmentary vertical sectional view taken substantially on the line IV—IV of Figure III.

Figure V is a fragmentary plan view taken along line V—V of Figure III.

The meat cutting band saw generally illustrated in Figure I has a base housing 1 which is erected on four short closed legs 2 and to which is attached by means of a pair of forwardly extending brackets 3, a runway 4 on which a movable table 5 is mounted to reciprocate. The top of the housing 1 is formed by a stationary table 6 which is co-planar with the moving table 5 to provide a working surface for handling the meat to be cut on the machine.

At the rear center portion of the housing 1 there is erected a hollow column 7 atop which is located a head 8. An upper saw wheel or pulley 9 is journaled in the head 8 and a lower saw wheel or pulley 10 is journaled within the base housing 1. A continuous band saw blade 11 runs on the two saw wheels 9 and 10 passing upwardly through the hollow column 7 and downwardly across a throat formed between the underside of the head 8 and the top of the table 6. A driving motor 12 is mounted in the base housing 1 and is drivingly connected to the lower saw wheel 10 by a drive belt 13.

A thickness gauge plate 14 is adjustably mounted for fore and aft movement along the right-hand side of the table 6 rearwardly from the cutting plane of the blade 11 to facilitate setting the position of the gauge plate 14 relative to the blade 11 to permit slices of meat of any desired thickness to be cut. A pusher plate 15 is slidable along one side of the table 5 to push and hold smaller pieces of meat against the thickness gauge plate 14 when the table is reciprocated to move the meat past the blade. The right side of the base housing 1 is closed by an access door 17 which is hinged at its forward edge and is provided with a handle 18 by which is can be opened.

The moving table 5 consists of a plate 221 which is welded upon a plurality of inverted channel-shaped cross members 222 which extend between two main angle bars 223. The table is secured on the two angle bars 223 by several studs 224, the heads of which are welded to the undersurface of the plate 221 and extend through holes bored through the horizontal angle bars 223. The table 5 reciprocates on a pair of horizontal spaced apart tracks 225, fixed to the brackets 3. The brackets 3 are bolted to the front outside wall of the base housing 1, the bolts passing through certain of the angle irons forming the main structural framework of the base housing. Each of the tracks 225 consists of an angle iron 226 having an outwardly extending arm 227 forming the track and an inwardly extending upper arm 228 which rests on the tops of bosses 229 formed on the brackets 3. A retaining plate 230 which consists of a flat plate overlying the upper inwardly extending arm 228 of the angle iron 226 is secured to the bosses 229 by a plurality of screws 231.

The table 5 rides on six anti-friction bearings 232 which are mounted on studs 233 fixed in the angle bars 223. Travel of the table from the position shown in solid lines to the position shown in dotted lines in Figure II permits a full sweep of meat carried on the table past the blade 11. Travel of the table on its track is limited by a stationary stop 234 near the right end of the track and by a movable stop 235 near the left end of the track.

The right edge of the table 5 is turned upwardly to form a flange 236 which serves as a guideway for the pusher plate 15. The pusher plate 15 has a flat vertical face 237 and a handle 238 which slidingly embraces the flange 236. The pusher plate 15 is used to hold smaller pieces of meat in place while cutting and, in particular, is useful when employed in conjunction with the thickness gauge plate 14 as, for example, in cutting steaks, to enable the last steak to be held in place without danger of injury to the operator.

To facilitate the cutting of pieces of meat such as steaks and chops to uniform thicknesses, the machine is equipped with the thickness gauge plate 14 which is adjustable rearwardly from the cutting plane of the blade any selected distance up to a predetermined maximum (four inches shown in the drawings). The thickness gauge plate 14 consists of a vertical plate 239 which extends upwardly and to the left from a tubular slide 240 mounted upon a guide rod 241 which extends from the front to the rear of the machine parallel and adjacent to the right edge of the table 6. The rod 241 is mounted in a pair of downwardly turned arms 242 which are cast integrally with a main table casting 16 and extend to the right some distance beyond the edge of the table. The slide 240 has a downwardly extending finger 243 which is engageable behind a lug 244 formed on the side and at the rear of an elongated positionable nut 245 which is threaded on a screw 246 rotatably mounted in the arms 242 parallel to and slightly outside and below the guide rod 241. The nut 245 has an upwardly extending arm 247 which also is mounted to slide along the guide rod 241 and prevent the nut from rotating with the screw 246 and which, when the finger 243 is engaged behind the lug 244 engages the front end of the slide 240. The screw 246 extends through the forward arm 242 where it is connected by means of a coupling 248 to a second shaft 249 which extends beneath the framework of the movable table 5 and is supported near its front end by a support 250 secured to the forward angle iron 226. A hand crank 251 is pinned on the front end of the shaft 249. When the hand crank 251 is rotated, the screw 246 shifts the nut 245. With the gauge plate slide 240 engaged between the lug 244 and the arm 247 of the nut 245 the gauge plate 14 is shifted correspondingly. Thus, by manipulating the hand crank 251, the position of the thickness gauge plate 14 can be selectively varied relative to the cutting plane of the blade 11.

When it is desired to cut a large piece of meat, the gauge plate 14 must be transplaced to the rear of the machine to clear the throat so that the large piece of meat can be moved therethrough. The gauge plate can be operatively disconnected from the nut 245 by pivoting it away from the table to disengage the finger 243 from the lug 244. The gauge plate 14 can then be slid the length of the guide rod 241 to the rear of the machine. Since the gauge plate must extend to the left up to the blade 11 in order to properly support meat being cut into relatively thin slices, its length is such that if it were slid directly to the rear of the machine, its left end would strike the column 7. Therefore, a fender 252 is provided at the rear of the machine and is formed integrally with the table casting 16 and the rear arm 242 as a horizontal shelf. The fender 252 extends to the right a sufficient distance so that the lower right-hand corner of the plate 239 between the guide rod 241 and the edge of the table 6 engages the fender 252 before the plate 239 may strike the column 7. The front edge of the fender 252 is mitered to cam the gauge plate 14 up and out swinging the plate 239 out of line of striking the column 7.

If the thickness gauge plate 14 has been employed to cut steaks of a certain thickness and it then becomes necessary to slide the gauge plate out of the way so that larger pieces of meat can be cut, the gauge plate need only be pivoted outwardly to disengage it from the nut 245 and slid directly to the rear of the machine. If it is then desired to return the gauge plate to the same position at which it was located before being removed, it can be merely slid forward until the front end of the slide 240 engages the arm 247 on the nut 245 and then pivoted toward the table to lock in its operative position. This returns the gauge plate to its original setting without requiring any other adjustment.

Various changes may be made in the details of construction and in the combination and arrangement of the several parts within the scope of the claims without departing from the spirit of the invention.

Having described the invention, we claim:

1. In a gauge for a commodity cutting device having a horizontal table and a cutting blade operating in a plane perpendicular to the table, in combination, a screw rotatably mounted below the table and extending horizontally along an edge of the table and being perpendicular to the cutting plane of the blade, means for rotating the screw, a guide rod mounted below the table and extending parallel to the screw, a nut threaded on the screw, means for preventing rotation of the nut during rotation of the screw, a gauge plate slidably mounted on the guide rod in parallel relationship to the cutting plane of the blade, and means for disengageably coupling the gauge plate to the nut comprising a projection on the nut spaced apart from the means for preventing rotation of the nut and means on the plate adapted to lockingly engage between the projection and the means for preventing rotation of the nut, whereby the gauge plate may be locked relative to the nut or may be disengaged from the nut by pivoting the plate on the rod and guided by the rod to a position remote from the blade.

2. In a gauge for a commodity cutting device having a horizontal table and a cutting blade operating in a plane perpendicular to the table, in combination, a screw rotatably mounted below the table and extending parallel to an edge of the table and being transverse to the cutting plane of the blade, means for rotating the screw, a positionable member threaded on the screw, guide means mounted below the table and extending parallel to the screw, a pair of spaced apart projections on the positionable member, one of the projections preventing rotation of the member during rotation of the screw, a gauge plate mounted on the guide means and having a face parallel to the cutting plane of the blade, the guide means being adapted to permit the plate to be movable laterally with respect to the cutting plane of the blade, and means on the plate adapted to lockingly engage between the projections on the member for disengageably coupling the plate to the member, whereby the gauge plate may be locked relative to the positionable member or may be disengaged from the member by pivoting the plate on the guide means and guided by the guide means to a position remote from the blade.

3. In a gauge for a commodity cutting device having a horizontal table and a cutting blade operating in a plane perpendicular to the table, in combination, a screw rotatably mounted below the table and extending horizontally along an edge of the table and being perpendicular to the cutting plane of the blade, means for rotating the screw, a nut threaded on the screw, a guide rod mounted below the table and extending parallel to the screw, an arm extending from the nut adapted to slide along the guide rod for preventing rotation of the nut during rotation of the screw, a gauge plate slidably mounted on the guide rod and having a face parallel to the cutting plane of the blade, and a lug extending from the nut remote from the arm on the nut, the gauge plate being lockingly engageable between the arm and the lug, whereby the plane of the plate may be adjusted relative to the plane of the blade by rotation of the screw for cutting slices of the commodity to predetermined thicknesses and to permit the plate to be disengaged from the nut and slid on the rod to a position remote from the blade.

4. In a gauge for a commodity cutting device having a horizontal table and a cutting blade operating in a plane perpendicular to the table, in combination, a screw rotatably mounted below the table and extending horizontally along an edge of the table and being perpendicular to the cutting plane of the blade, means for rotating the screw, a nut threaded on the screw, a guide rod mounted below the table and extending parallel to the screw, a pair of spaced apart projections on the nut, one of the projections adapted to slide along the guide rod for preventing rotation of the nut during rotation of the screw, a gauge plate slidably mounted on the guide rod and having a face parallel to the cutting plane of the blade, a finger extending from the plate and adapted to lockingly engage one of the projections on the nut for disengageably coupling the plate to the nut, whereby the gauge plate may be locked relative to the nut or may be disengaged from the nut by pivoting the plate on the rod and guided by the rod to a position remote from the blade.

5. In a gauge for a commodity cutting device having a horizontal table and a cutting blade operating in a plane perpendicular to the table, in combination, a screw rotatably mounted below the table and extending horizontally along an edge of the table and being perpendicular to the cutting plane of the blade, means for rotating the screw, a guide rod mounted below the table and extending parallel to the screw, an elongated nut threaded on the screw and having an arm slidingly engaging the rod, the nut being positionable along the screw by rotation of the screw, a lug on the nut remote from the arm thereon, a tubular slide adapted to be guided along the rod and having a gauge plate extending from the slide over the table with the face thereof parallel to the cutting edge of the blade, and a finger extending from the slide adapted to disengageably engage the side of the lug nearest the arm, whereby the slide may be locked relative to the nut or may be disengaged from the nut by pivoting the slide on the rod and guided by the rod to a position remote from the blade.

References Cited in the file of this patent

UNITED STATES PATENTS

| | | |
|---|---|---|
| 2,280,621 | Biro | Apr. 21, 1942 |
| 2,380,700 | Lasar | July 31, 1945 |
| 2,492,824 | Ahrndt et al. | Dec. 27, 1949 |
| 2,585,957 | Meeker et al. | Feb. 19, 1952 |